United States Patent
Lu et al.

(10) Patent No.: US 7,739,393 B2
(45) Date of Patent: Jun. 15, 2010

(54) APPARATUS AND METHOD FOR RESTORING TRAFFIC DURING FAILOVER IN A CABLE HEAD END

(75) Inventors: Yong Lu, San Jose, CA (US); Jin Zhang, Cupertino, CA (US); Sunil Khaunte, Santa Clara, CA (US); Kartik Chandran, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1369 days.

(21) Appl. No.: 10/058,722

(22) Filed: Jan. 28, 2002

(65) Prior Publication Data

US 2004/0034871 A1    Feb. 19, 2004

(51) Int. Cl.
G06F 15/16 (2006.01)
(52) U.S. Cl. ............... 709/230; 709/207; 709/223; 725/114; 725/116; 725/117; 725/111; 725/91; 370/241; 370/242
(58) Field of Classification Search ............. 709/207, 709/223, 224, 226, 225; 370/241, 242; 725/143, 725/114, 116, 117, 11, 91, 93
See application file for complete search history.

(56) References Cited

U.S. PATENT DOCUMENTS

| 4,527,235 A | 7/1985 | Chebra | 364/200 |
| 5,818,845 A | 10/1998 | Moura et al. | 370/449 |

(Continued)

FOREIGN PATENT DOCUMENTS

| JP | 11-215150 | 8/1999 |
| WO | 01/82495 A2 | 5/2001 |

OTHER PUBLICATIONS

International Search Report, Application No. PCT/US03/02225, Mailed Nov. 26, 2003; 5 pages.
Canadian Office Action dated Aug. 9, 2007 from corresponding Canadian Application No. 2,474,587.

*Primary Examiner*—Saleh Najjar
*Assistant Examiner*—Thuong T Nguyen
(74) *Attorney, Agent, or Firm*—Weaver Austin Villeneuve & Sampson LLP

(57) ABSTRACT

Disclosed are methods and apparatus for guaranteeing restoration of traffic between one or more cable modems and a backup cable modem termination system upon failure of an active cable modem termination system are disclosed. Subscriber information associated with one or more cable modems are received from an active cable modem termination system. The subscriber information includes one or more subscriber identifiers. For instance, the subscriber information may include a primary subscriber identifier that identifies a particular cable modem as well as a secondary subscriber identifier that is assigned to high priority traffic such as that being transmitted in real-time. In addition, the subscriber information may also include a scheduling type that is further used to categorize the real-time traffic, such as into voice or video traffic. The subscriber information is then prioritized in an order in which the transmission of messages between the one or more cable modems and the backup cable modem are to be restored. For instance, the subscriber information may be prioritized according to time of receipt of the subscriber information, presence of secondary subscriber identifier, and/or scheduling type. The cable modems are then polled according to this priority order.

41 Claims, 17 Drawing Sheets

U.S. PATENT DOCUMENTS

| | | | |
|---|---|---|---|
| 6,331,987 B1 * | 12/2001 | Beser | 370/486 |
| 6,434,165 B1 * | 8/2002 | Sherer et al. | 370/465 |
| 6,546,017 B1 * | 4/2003 | Khaunte | 370/412 |
| 6,690,655 B1 * | 2/2004 | Miner et al. | 370/278 |
| 6,816,500 B1 * | 11/2004 | Mannette et al. | 370/431 |
| 6,909,715 B1 * | 6/2005 | Denney et al. | 370/392 |
| 6,999,414 B2 * | 2/2006 | Gummalla et al. | 370/230 |
| 7,058,007 B1 * | 6/2006 | Daruwalla et al. | 370/216 |
| 7,072,365 B1 * | 7/2006 | Ansley | 370/535 |
| 2002/0054629 A1 * | 5/2002 | Roos | 375/222 |
| 2002/0066110 A1 * | 5/2002 | Cloonan et al. | 725/111 |
| 2002/0144147 A1 * | 10/2002 | Basson et al. | 713/201 |
| 2002/0144284 A1 * | 10/2002 | Burroughs et al. | 725/111 |
| 2003/0012203 A1 * | 1/2003 | Deshpande et al. | 370/401 |
| 2003/0141971 A1 * | 7/2003 | Heiken, Jr. | 340/506 |
| 2004/0198237 A1 * | 10/2004 | Abutaleb et al. | 455/78 |

* cited by examiner

| Modem ID | MAC address | |
|---|---|---|
| ID1 | MAC1 | |
| ID2 | MAC2 | |
| . | . | 402 |
| . | . | |
| IDN | MACN | |
| Time of arrival t1 | | 408 |

| Modem ID | MAC address | |
|---|---|---|
| ID1 | MAC1 | |
| ID2 | MAC2 | |
| . | . | 410 |
| . | . | |
| IDN | MACN | |
| Time of arrival t2 | | 416 |

FIG. 4

Sync message

| Primary subscriber ID 1202 | Secondary subscriber ID 1204 |
|---|---|
| Service template including QOS 1206 requirements (e.g., scheduling type) | |
| Packet classifier 1208 | |

FIG. 12

APPARATUS AND METHOD FOR RESTORING TRAFFIC DURING FAILOVER IN A CABLE HEAD END

BACKGROUND OF THE INVENTION

The present invention relates to digital computer network technology. More specifically, it relates to methods and apparatus for restoring traffic within an access network.

Broadband access technologies such as cable, fiber optic, and wireless have made rapid progress in recent years. Recently there has been a convergence of voice and data networks which is due in part to United States deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services.

A head end complex and cable modem typically communicate. This communication may be one-way or two-way between the cable modem and head end complex. In one way communication, the cable modem merely receives data from the head end complex, but cannot transmit data to the head end complex. For example, the cable modem cannot request particular types of data from the head end complex. In two-way communication, the cable modem can transmit data (e.g., data requests) to the head end complex.

There are circumstances that may interfere with the communication between a cable Head End and a cable modem. As one example, there may be a hardware failure of the cable Head End. As another example, there may be a software failure within the cable Head End. As yet another example, there may be a power outage that causes communication between the cable Head End and the cable modem to be disrupted.

In order to ensure that communication between a cable Head End and a cable modem has not been interrupted, a handshake is typically exchanged between the cable Head End and the cable modem. More particularly, this handshake is typically initiated by the cable Head End. Thus, when the cable modem does not receive a communication from the cable Head End within a period of time, the cable modem declares a time out.

When a time out occurs, the cable modem initiates a new connection with the cable Head End. Unfortunately, this new connection takes time to establish. For instance, it may take up to 24 seconds to rebuild a connection between a cable modem and its cable Head End.

In the event that a cable Head End fails, it would be undesirable to abruptly disconnect the modem from the cable Head End to re-initiate a connection. This is particularly undesirable when real-time traffic such as voice or video data is being transmitted. Even if the connection were merely delayed, such a substantial delay during a real-time transmission such as a phone call is unacceptable.

In view of the above, it would be desirable to prevent a time out of a cable modem when a cable Head End fails. Moreover, it would be desirable if the effects of a time out could be minimized.

SUMMARY OF THE INVENTION

The present invention relates to the prioritization and restoration of communication between a cable Head End and one or more modems upon failure of a cable modem termination system (CMTS). This is accomplished, through the use of a backup CMTS that supports one or more active CMTSs. The backup CMTS prioritizes the modems according to associated subscriber information, and polls the modems accordingly. In this manner, the occurrence of a time out of a cable modem upon failure of a CMTS is prevented.

Disclosed are methods and apparatus for guaranteeing restoration of traffic between one or more cable modems and a backup cable modem termination system upon failure of an active cable modem termination system are disclosed. Subscriber information associated with one or more cable modems are received from an active cable modem termination system. The subscriber information includes one or more subscriber identifiers. For instance, the subscriber information may include a primary subscriber identifier that identifies a particular cable modem as well as a secondary subscriber identifier that is assigned to high priority traffic such as that being transmitted in real-time. In addition, the subscriber information may also include a scheduling type that is further used to categorize the real-time traffic, such as into voice or video traffic. The subscriber information is then prioritized in an order in which the transmission of messages between the one or more cable modems and the backup cable modem are to be restored. For instance, the subscriber information may be prioritized according to time of receipt of the subscriber information, presence of secondary subscriber identifier, and/or scheduling type. The cable modems are then polled according to this priority order.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. Moreover, the invention pertains to a cable modem termination system employing the disclosed methods. In addition, the invention pertains to various combinations and arrangements of data generated and/or used as described herein. For example, modem databases having the format described herein and provided on appropriate media are part of this invention.

These and other features and advantages of the present invention will be presented in more detail in the following specification of the invention and the accompanying figures which illustrate by way of example the principles of the invention.

BRIEF DESCRIPTION OF THE DRAWINGS

FIG. 4 is a block diagram illustrating information stored by a backup CMTS in association with one or more ranging lists received by an active CMTS as shown at block 306 of FIG. 3 in accordance with an embodiment of the invention.

FIG. 12 is a diagram illustrating an exemplary sync message that may be sent by an active CMTS to a backup CMTS as shown at block 1104 of FIG. 11.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
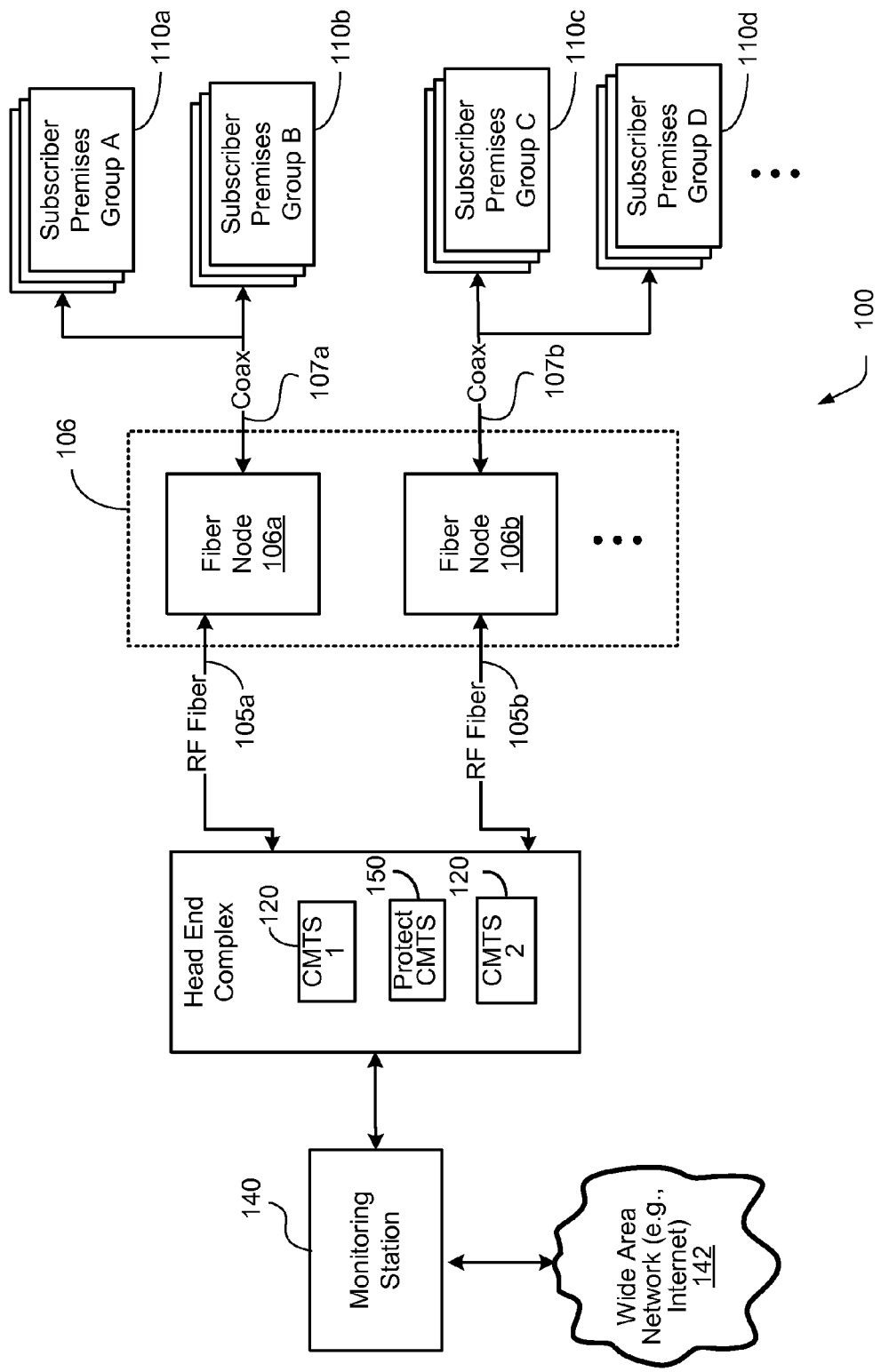
FIG. 1 is a diagram illustrating a specific embodiment of a cable network that may be used with the techniques of the present invention.

FIG. 1 shows a block diagram of a two-way hybrid fiber-coaxial (HFC) cable network 100 in accordance with one embodiment of the present invention. Of course, the present invention may also be implemented on a one-way cable network. As shown in FIG. 1, the cable network 100 includes a Head End complex 102 typically configured to service about 40,000 homes. The Head End complex 102 may include a plurality of components and/or systems (not shown) such as, for example, a Head End, a super Head End, a hub, a primary hub, a second hub, etc. Additionally, as shown in FIG. 1, the Head End complex 102 typically includes a Cable Modem Termination System (CMTS) 120. Primary functions of the CMTS include (1) receiving data inputs from external sources 100 and converting the data for transmission over the cable plant; (2) providing appropriate Media Access Control (MAC) level packet headers for data received by the cable system, and (3) modulating and demodulating the data to and from the cable network. Typically, the Head End complex 102 is configured to provide a communication interface between nodes (e.g. cable modems) in the cable network and external networks such as, for example, the Internet 142. The cable modems typically reside at the subscriber premises 110A-D.

The Head End Complex 102 is typically connected to one or more fiber nodes 106 in the cable network. Each fiber node is, in turn, configured to service one or more subscriber groups 110. Each subscriber group typically comprises about 500 to 2000 households. A primary function of the fiber nodes 106 is to provide an optical-electronic signal interface between the Head End Complex 102 and the plurality of cable modems residing at the plurality of subscriber groups 110.

In order for data to be able to be transmitted effectively over a computer network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 1.1 RF Interface Specification (document control number SP-RFIv1.1-I06-001215, Dec. 15, 2000). This document is incorporated herein by reference for all purposes.

Communication between the Head End Complex 102 and fiber node 106a is typically implemented using modulated optical signals which travel over fiber optic cables. More specifically, during the transmission of modulated optical signals, multiple optical frequencies are modulated with data and transmitted over optical fibers such as, for example, optical fiber links 105a and 105b of FIG. 1, which are typically referred to as "RF fibers". As shown in FIG. 1, the modulated optical signals transmitted from the Head End Complex 102 eventually terminate at the fiber node 106a. The fiber nodes maintain the signal modulation while converting from the fiber media to the coax media and back.

Each of the fiber nodes 106 is connected by a coaxial cable 107 to a respective group of cable modems residing at subscriber premises 110A-D. According to the DOCSIS standard, specific frequency ranges are used for transmitting downstream information from the CMTS to the cable modems, and other specific frequency ranges are used for transmitting upstream information from the cable modems to the CMTS.

In order to allow the cable modems to transmit data to the CMTS, the cable modems share one or more upstream channels within that domain. Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timer counter, which, according to conventional implementations is a 32-bit counter that increments by one every clock pulse.

Typically, digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a Cable Modem Termination System ("CMTS"), located at a Head End Complex of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

Over time different types of messages are communicated between the head end 102 and one or more cable modem(s). In one embodiment, these messages may include MAP messages, dynamic service messages, and other types of data messages. The head end 102 periodically sends a MAP message that specifies one or more times slots for identified cable modems to the cable modems 110 associated with such head end 102. A cable modem 110 or CMTS may send a dynamic service message for adding, deleting, or changing a particular service type or a parameter of an existing service. A data message is generally defined as any type of message that is communicated between the head end 102 and one or more cable modems. For instance, the message may include real-time data such as voice or video data.

In accordance with various embodiments of the invention, a backup or "protect" CMTS 150 supports one or more CMTSs 120. These CMTSs 120 will be referred to as "active" CMTSs to distinguish them from the backup CMTS 150 which operates merely in a backup mode. Thus, an active CMTS will operate until it is no longer functional. At that time, the backup CMTS 150 will "replace" or take over those operations of the non-functional active CMTS(s). In other words, upon failure of an active CMTS, the backup CMTS 150 will receive messages from and transmit messages to modems previously supported by the active CMTS. The CMTSs 120 and backup CMTS 150 may be supported in a single head end complex as shown, or in separate head end complexes.

The present invention provides mechanisms for restoring transmission of messages between one or more cable modems and a backup cable modem termination system upon failure of an active cable modem termination system. Subscriber information associated with one or more cable modems is received from an active cable modem termination system. The subscriber information may include one or more subscriber identifiers. For instance, the subscriber information may include one or more primary subscriber identifiers, each of which uniquely identifies a cable modem. As another example, the subscriber information may include one or more secondary subscriber identifiers, which may be used to indicate the type of traffic being transmitted. For instance, the secondary subscriber identifier is typically used to identify real-time data traffic such as voice or video data. The backup cable modem termination system then prioritizes the subscriber information, the prioritized subscriber information indicating an order in which the transmission of messages between the cable modems and the backup cable modem is to be restored. The backup cable modem termination system then poll the cable modems according to the priority order indicated by the prioritized subscriber information.

Messages transmitted between the head end complex 120 and various subscribers may be transmitted or received via any suitable network, such as wide area network 142 (e.g., Internet). In this manner, subscriber devices such as cable modems may transmit and receive messages.

Figure 2:
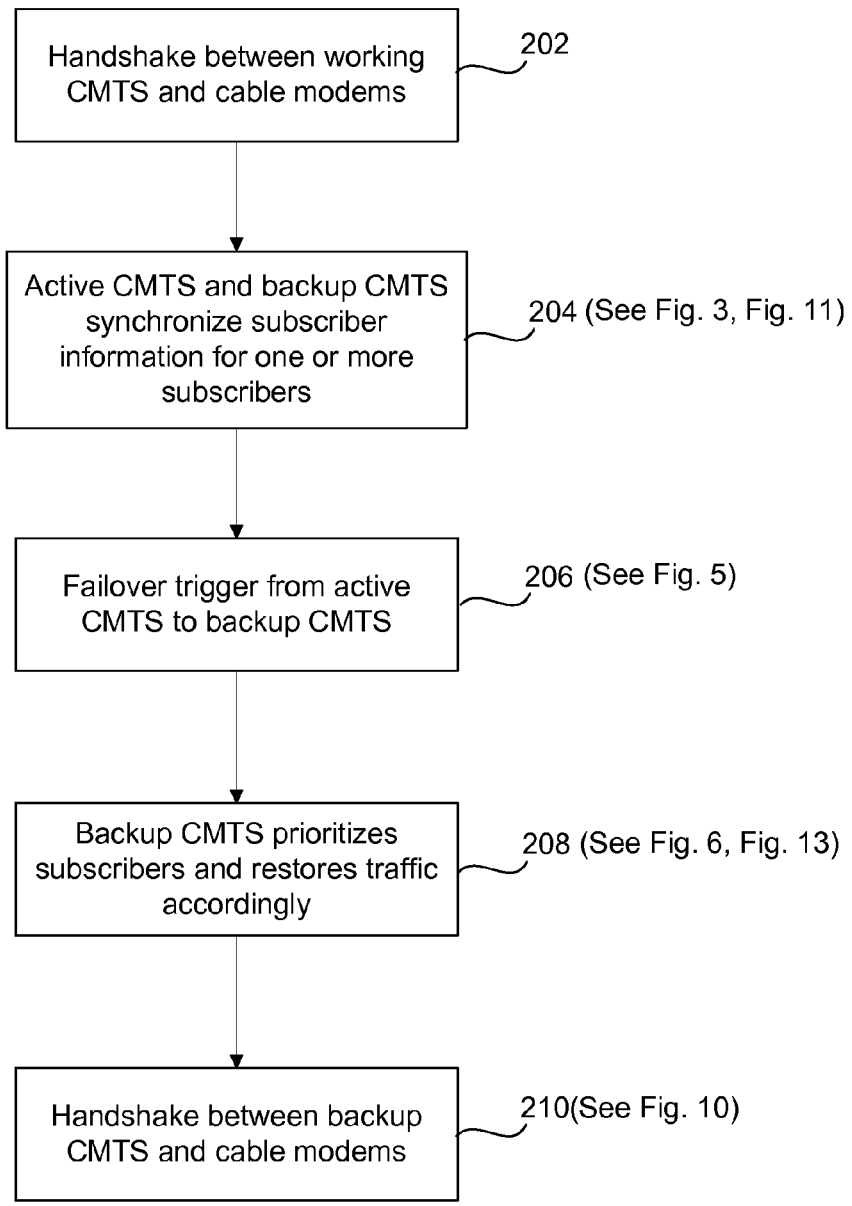
FIG. 2 is a process flow diagram illustrating a method of prioritizing subscribers associated with one or more cable modems in accordance with various embodiments of the present invention.

FIG. 2 is a process flow diagram illustrating a method of prioritizing subscribers associated with one or more cable modems in accordance with various embodiments of the present invention. As shown, an active or "working" CMTS typically performs a handshake with its supported cable modems at block 202. More specifically, the active CMTS sends a ranging poll to the modems, requesting that the supported modems send its operating parameters to the active CMTS. In response, the modems send a ranging request with its parameters. The active CMTS then sends its ranging response, indicating that the parameters received by the associated modem are accepted.

At block 204 the active CMTS and backup CMTS synchronize subscriber information for one or more subscribers (e.g., modems). In other words, the backup CMTS receives or obtains subscriber information from one or more active CMTSs. Various methods of synchronizing subscriber information will be described in further detail below with reference to FIG. 3 and FIG. 11.

When an active CMTS fails, a failover trigger is provided by the active CMTS to one or more backup CMTSs at block 206. The "failover trigger" indicates to the backup CMTS that the active CMTS is no longer functional. Such a failover trigger is typically implemented through the periodic detection of "hello messages." In other words, a failover trigger may be implemented through an absence of "hello messages" or failure to detect "hello messages" for a specified period of time. One method of implementing a failover trigger will be described in further detail below with reference to FIG. 5.

Once the backup CMTS determines that an active CMTS has failed, it then prioritizes the subscribers supported by the CMTS and restores traffic accordingly at block 208. The subscribers may be prioritized for each failed CMTS. In addition, various methods of prioritizing the subscriber information for each failed CMTS may be implemented. Two exemplary methods of prioritizing the subscribers will be described in further detail below with reference to FIG. 6 and FIG. 13.

A handshake is then performed between the backup CMTS and cable modems previously supported by the failed CMTS(s) at block 210. For instance, the backup CMTS may simply perform a handshake such as that described above with reference to block 202. One method of performing a handshake by a backup CMTS will be described in further detail below with reference to FIG. 10.

Figure 3:
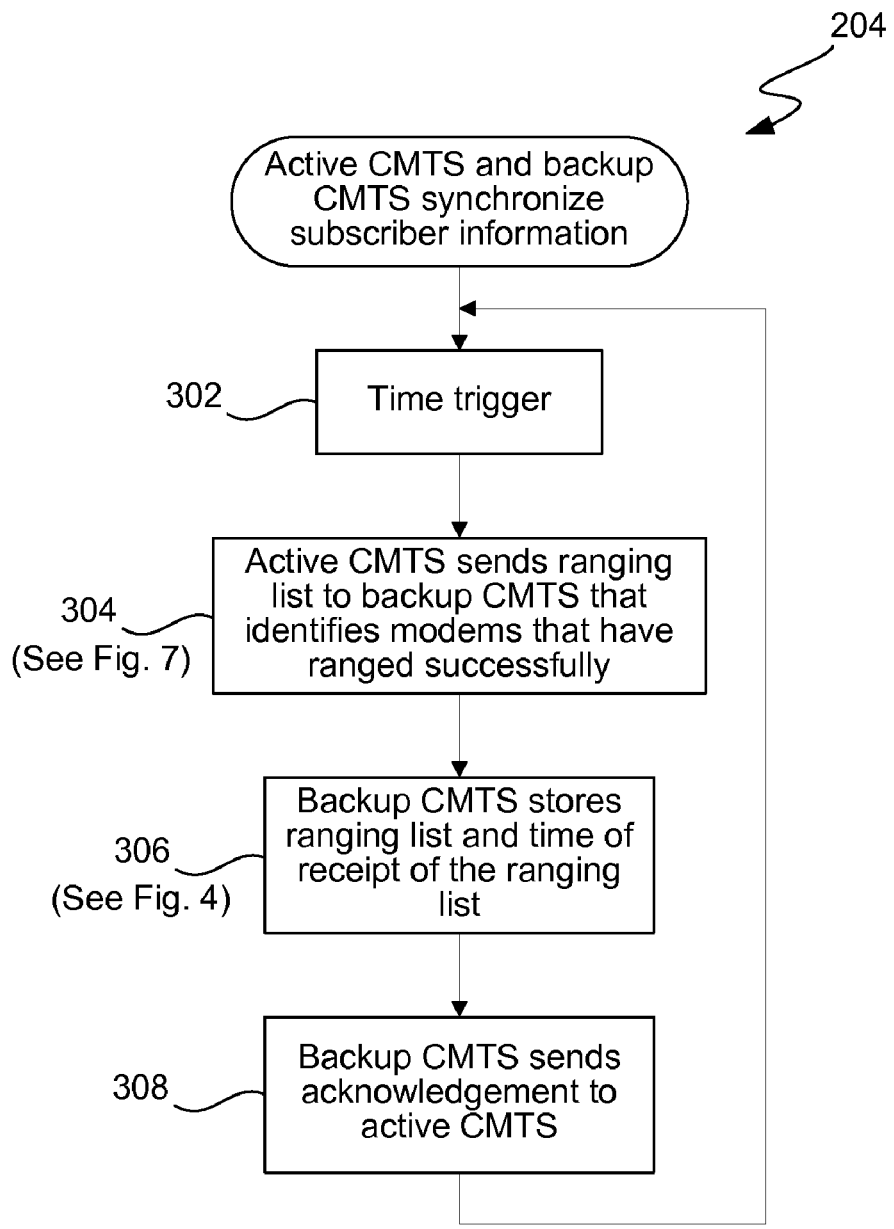
FIG. 3 is a process flow diagram illustrating a method of synchronizing subscriber information for one or more subscribers between an active CMTS and a backup CMTS as shown at block 204 of FIG. 2 in accordance with an embodiment of the invention.

FIG. 3 is a process flow diagram illustrating a method of synchronizing subscriber information for one or more subscribers between an active CMTS and a backup CMTS as shown at block 204 of FIG. 2 in accordance with an embodiment of the invention. Any event may trigger the sending of subscriber information from an active CMTS to a backup CMTS. In this example, a lapse of a specified period of time at block 302 triggers the sending of the subscriber information as shown at block 304. In other words, the subscriber information is sent periodically to the backup CMTS. The subscriber information preferably identifies those modems that have ranged successfully, which may be referred to as a "ranging list." An exemplary ranging list will be described in further detail below with reference to FIG. 7.

When the backup CMTS receives the subscriber information (e.g., ranging list), it preferably stores the time of receipt of the subscriber information by the backup CMTS such that the subscriber information is associated with the time of receipt as shown at block 306. Various data structures may be used to store the time-stamped subscriber information. Such exemplary data structures are described below with reference to FIG. 4. The backup CMTS may then send an acknowledgement of the subscriber information to the active CMTS at block 308.

FIG. 4 is a block diagram illustrating information stored by a backup CMTS in association with one or more ranging lists received by an active CMTS as shown at block 306 of FIG. 3 in accordance with an embodiment of the invention. The information stored by a backup CMTS for a single active CMTS may include subscriber information received at multiple points in time. For instance, as shown, a first ranging list 402 includes multiple entries, each of which includes a primary subscriber identifier 404 that uniquely identifies a cable modem. Each entry preferably further includes a media access control (MAC) address 406 associated with the cable modem. A set of subscriber information such as a ranging list 402 is associated with a time of receipt 408 of the ranging list 402 by the backup CMTS. Similarly, a second ranging list 410 includes multiple entries, each of which include a primary subscriber identifier 412 and a MAC address 414. The second ranging list 416 is similarly associated with a time of receipt 416 of the ranging list 416 by the backup CMTS.

Figure 5:
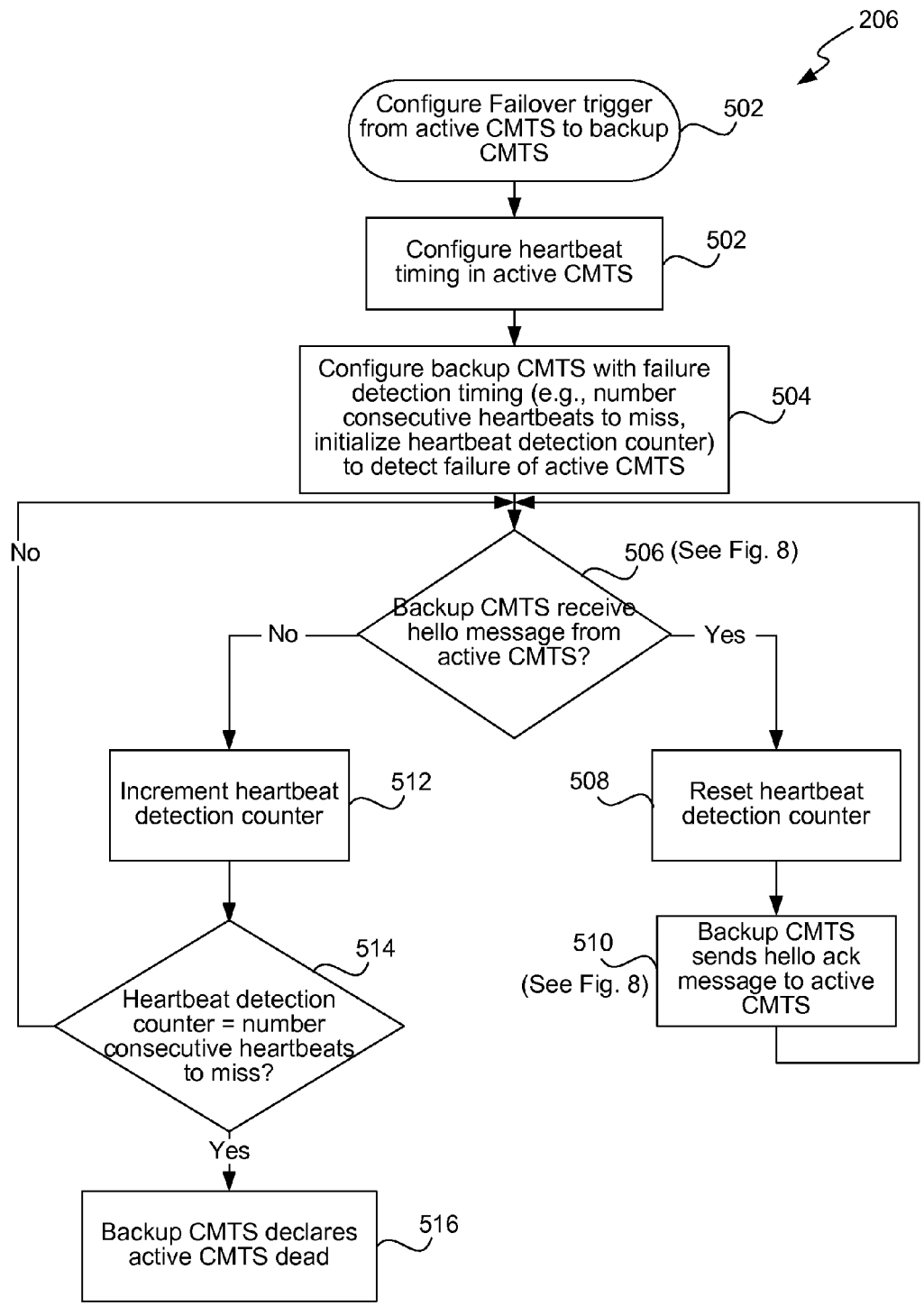
FIG. 5 is a process flow diagram illustrating a method of providing a failover trigger from an active CMTS to a backup CMTS as shown at block 206 of FIG. 2.

FIG. 5 is a process flow diagram illustrating a method of providing a failover trigger from an active CMTS to a backup CMTS as shown at block 206 of FIG. 2. As shown, heartbeat timing is configured in the active CMTS at block 502, which indicates the frequency with which hello messages are to be sent from the active CMTS. Similarly, the backup CMTS is also configured with failure detection timing at block 504 so that the backup CMTS is configured with a number of consecutive heartbeats to be missed (undetected) to signal a failure of the active CMTS. Thus, a heartbeat detection counter is preferably initialized to zero to indicate the number of heartbeats that have been missed. It is then determined at block 506 whether the backup CMTS has received a hello message from the active CMTS. If so, the heartbeat detection counter is reset to zero at block 508 and the backup CMTS sends a hello acknowledgement message to the active CMTS at block 510. An exemplary hello and hello acknowledgement message will be described in further detail below with reference to FIG. 8. If a hello message is not received from the active CMTS, the heartbeat detection counter is incremented at block 512. If the heartbeat detection counter is equal to the number of consecutive heartbeats to miss at block 514, the backup CMTS declares the active CMTS dead at block 516.

Figure 6:
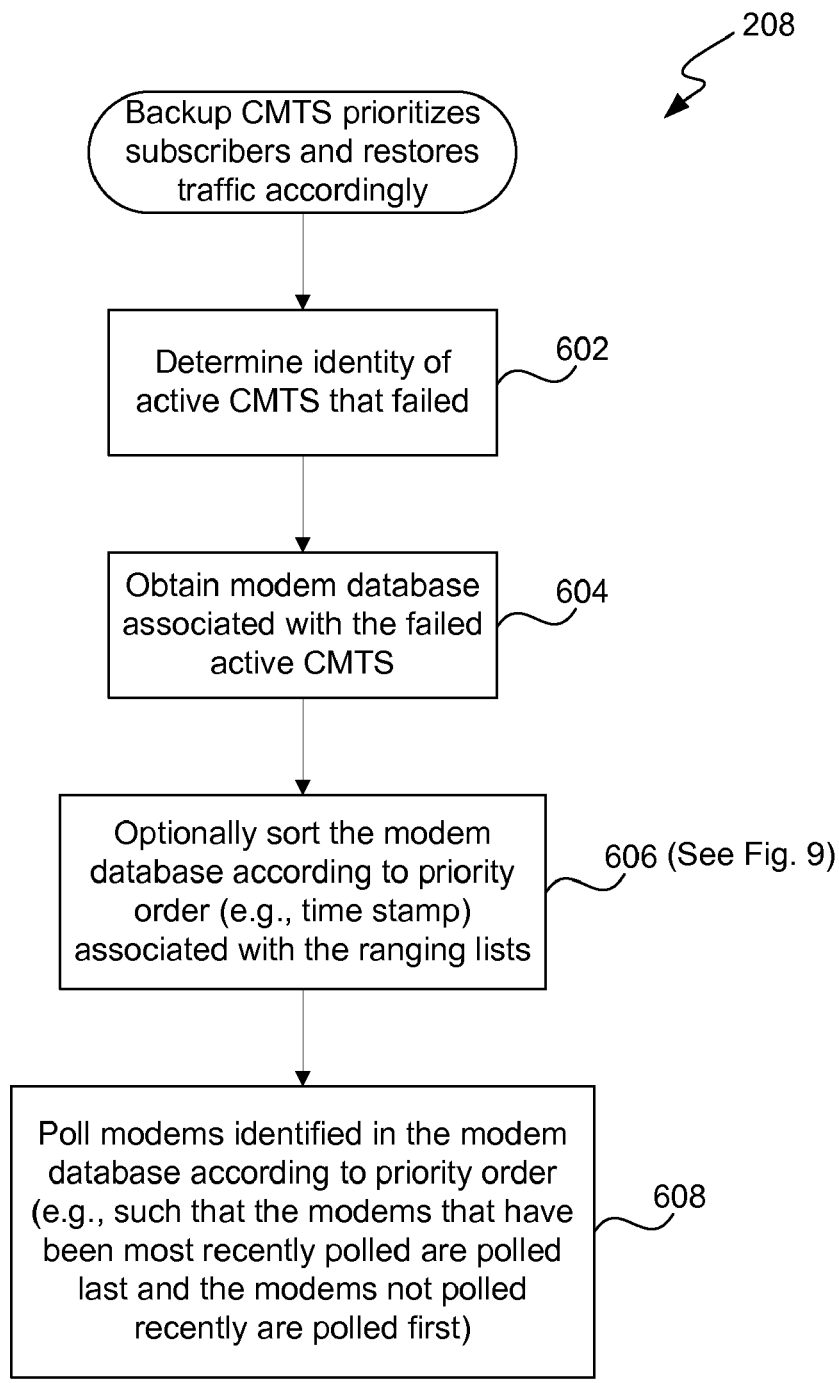
FIG. 6 is a process flow diagram illustrating a method of prioritizing subscribers and restoring traffic accordingly as shown at block 208 of FIG. 2 in accordance with one embodiment of the invention.

FIG. 6 is a process flow diagram illustrating a method of prioritizing subscribers and restoring traffic accordingly as shown at block 208 of FIG. 2 in accordance with one embodiment of the invention. As shown, the backup CMTS determines the identity of the failed CMTS at block 602. Subscriber information associated with one or more cable modems previously supported by the active CMTS is then obtained at block 604. For instance, a database maintained by the backup CMTS storing subscriber information associated with the active CMTS may be obtained. The subscriber information may then be sorted according to a priority order (e.g., specified by time stamp of each ranging list) at block 606, as will be described in further detail below with reference to FIG. 9. However, such sorting may be unnecessary. In other words, the subscriber information may be automatically prioritized according to time stamp when the subscriber information is stored, since the subscriber information (e.g., ranging list) and associated time of receipt may be stored consecutively (in order of the time of receipt) upon receipt in a file or database. The modems identified in this prioritized subscriber information are then polled according to the implicit or explicit priority order at block 608. In this manner, the modems that have been most recently polled are polled last and the modems not polled recently are polled first.

Figure 7:
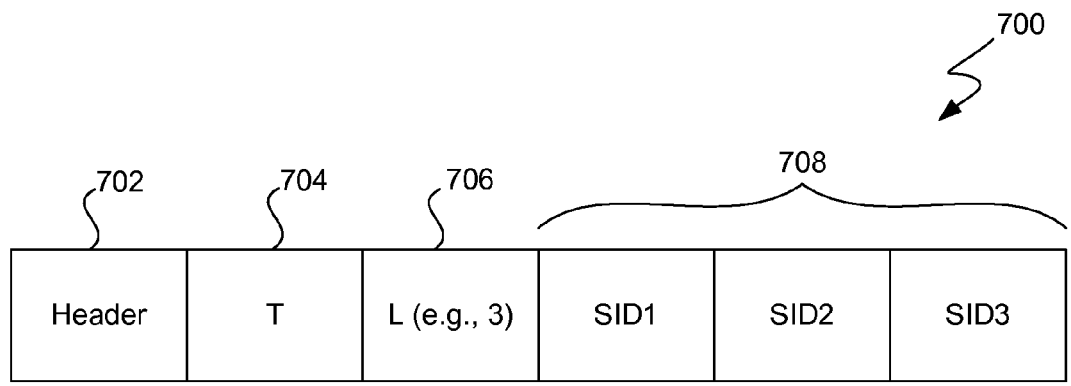
FIG. 7 is a diagram illustrating an exemplary ranging list that may be sent by an active CMTS to a backup CMTS as shown at block 304 of FIG. 3.

As described above, the subscriber information may include one or more ranging lists. FIG. 7 is a diagram illustrating an exemplary ranging list that may be sent by an active CMTS to a backup CMTS as shown at block 304 of FIG. 3. As shown, the ranging list 700 includes a header 702, type 704, length 706, and value 708 field. For instance, the length may indicate the number of primary subscriber identifiers present in the value field 708.

Figure 8:
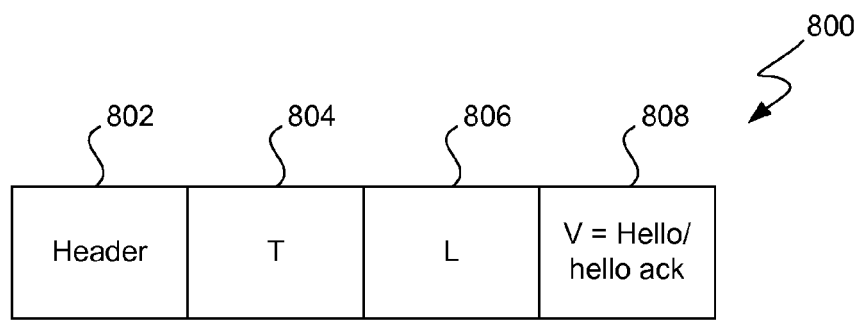
FIG. 8 is a diagram illustrating an exemplary hello message that may be sent by an active CMTS and corresponding exemplary hello acknowledgement message that may be sent by a backup CMTS as shown at blocks 506 and 510 of FIG. 5, respectively.

Identification of a failed CMTS may occur when a specified number of consecutive hello messages are not detected by a backup CMTS. FIG. 8 is a diagram illustrating an exemplary hello message that may be sent by an active CMTS and corresponding exemplary hello acknowledgement message that may be sent by a backup CMTS as shown at blocks 506 and 510 of FIG. 5, respectively. As shown, a hello or hello acknowledgement message 800 includes a header 802, type 804, length 806 and value 808 field. As shown, the value field 808 may indicate whether the message is a hello or hello acknowledgement message. The hello and hello acknowledgement messages may be implemented in a variety of protocols such as the Hot Chassis to Chassis Protocol (HCCP).

Figure 9:
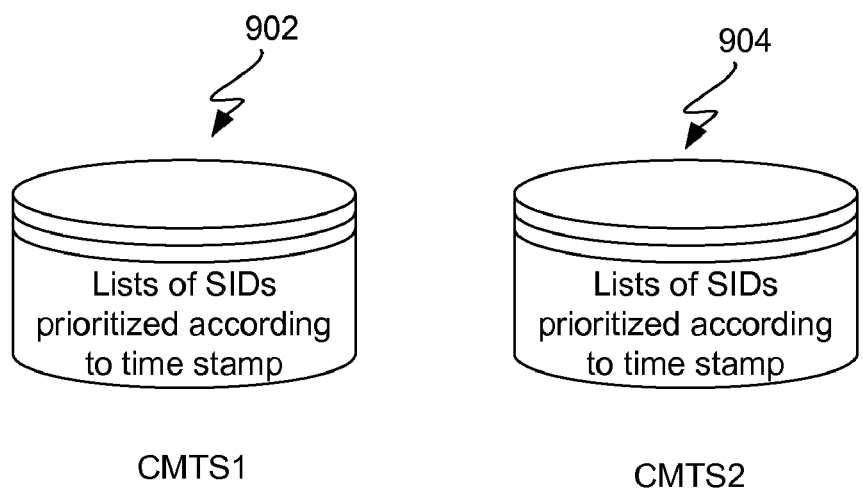
FIG. 9 is a diagram illustrating exemplary databases storing prioritized subscriber information for associated active CMTS' that may be maintained by a backup CMTS as shown at block 606 of FIG. 6.

As described above, subscriber information associated with one or more cable modems may be received periodically from one or more active cable modem termination systems, which may then be separately prioritized and stored in memory (e.g., in a file or database). FIG. 9 is a diagram illustrating exemplary databases storing prioritized subscriber information for associated active CMTS' that may be maintained by a backup CMTS as shown at block 606 of FIG. 6. As shown, a first database 902 stores a plurality of ranging lists obtained from a first CMTS that are prioritized according to time stamp. Similarly, a second database 904 stores a plurality of ranging lists obtained from a second CMTS that are prioritized according to time stamp.

Figure 10:
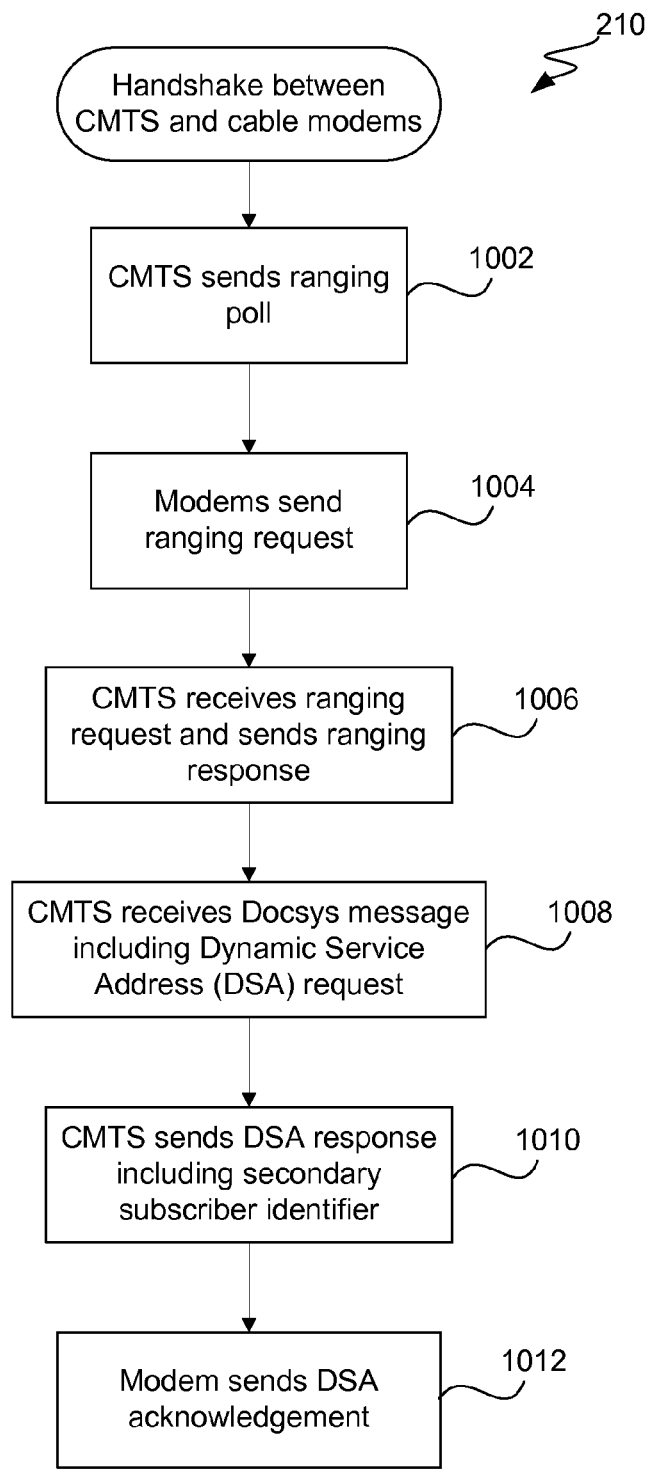
FIG. 10 is a process flow diagram illustrating a method of performing a handshake between a backup CMTS and one or more cable modems as shown at block 210 of FIG. 2 in accordance with various embodiments of the invention.

FIG. 10 is a process flow diagram illustrating a method of performing a handshake between a backup CMTS and one or more cable modems as shown at block 210 of FIG. 2 in accordance with various embodiments of the invention. As shown, the backup CMTS sends a ranging poll message at block 1002 to one or more modems. The modems then send a ranging request at block 1004. The CMTS receives the ranging request at block 1006 and sends a ranging response. When the CMTS receives a DOCSIS message at block 1008 including a Dynamic Service Address (DSA) request, the CMTS sends a DSA response including a secondary subscriber identifier 1010. A secondary subscriber identifier is typically assigned to a particular modem to indicate the type of data being transmitted. For instance, the secondary subscriber identifier may indicate that the data is being transmitted in real-time (e.g., voice or video data). The modem then sends a DSA acknowledgement at block 1012.

As described above, subscriber information is preferably prioritized separately for each CMTS rather than for all CMTSs combined. The subscriber information may be prioritized according to time stamp. However, the subscriber information may also be prioritized according to other criteria, instead of, or in combination with the time stamps. For instance, the presence of a secondary subscriber identifier may also be used to prioritize various subscribers.

Figure 11:
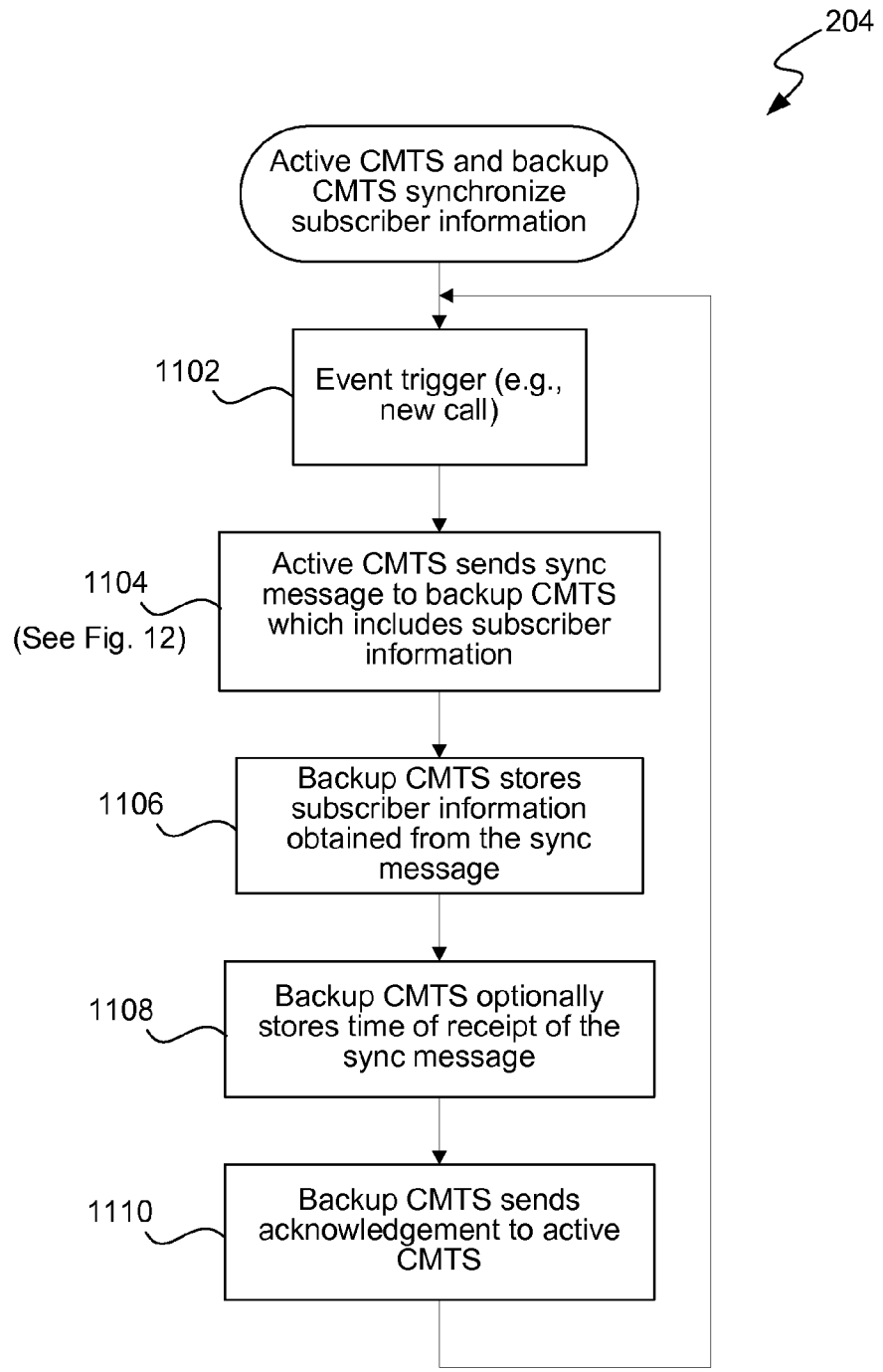
FIG. 11 is a process flow diagram illustrating a method of synchronizing subscriber information for one or more subscribers between an active CMTS and a backup CMTS as shown at block 204 of FIG. 2 in accordance with another embodiment of the invention.

When information such as a secondary subscriber identifier is used to prioritize a particular call, it may be desirable to trigger the sending of the associated subscriber information upon receipt of the call by the active CMTS from a cable modem (rather than periodically sending the subscriber information after a specified period of time). FIG. 11 is a process flow diagram illustrating a method of synchronizing subscriber information for one or more subscribers between an active CMTS and a backup CMTS as shown at block 204 of FIG. 2 in accordance with another embodiment of the invention. The event that triggers the sending of subscriber information may be the receipt of a new call as shown at block 1102. Once received, the active CMTS sends subscriber information in the form of a sync message to the backup CMTS at block 1104. An exemplary sync message will be described in further detail below with reference to FIG. 12.

When the backup CMTS receives the sync message, the backup CMTS stores the subscriber information obtained from the sync message at block 1106. The backup CMTS may also store the time of receipt of the sync message at block 1108. The backup CMTS may also send an acknowledgement to the active CMTS at block 1110. Thus, upon subsequent failure of an active CMTS, the backup CMTS may prioritize the stored subscriber information.

FIG. 12 is a diagram illustrating an exemplary sync message that may be sent by an active CMTS to a backup CMTS as shown at block 1104 of FIG. 11. As shown, a sync message 1200 and therefore subscriber information may include a primary subscriber identifier 1202 as well as a secondary subscriber identifier 1204. The sync message 1200 may also include a service template including quality of service requirements 1206. The quality of service requirements 1206 may define attributes of the traffic, which may include a variety of attributes, such as packet size, maximum traffic rate, For instance, the quality of service requirements 1206 may include attributes of voice traffic. The quality of service requirements 1206 also typically include a scheduling type. For instance, various possible scheduling types include best effort, variable bit rate, Unsolicited Grant Service (UGS) or Unsolicited Grant with Activity Detection (UGSAD). In addition, the sync message 1200 may also include a packet classifier 1208. A packet classifier typically includes a source and destination address, which are used to determine the treatment to be applied to packets as specified in the service template according to the specified source and destination address. For instance, calls initiated by and/or received from various IP addresses may be treated differently, and therefore may be prioritized accordingly.

Figure 13:
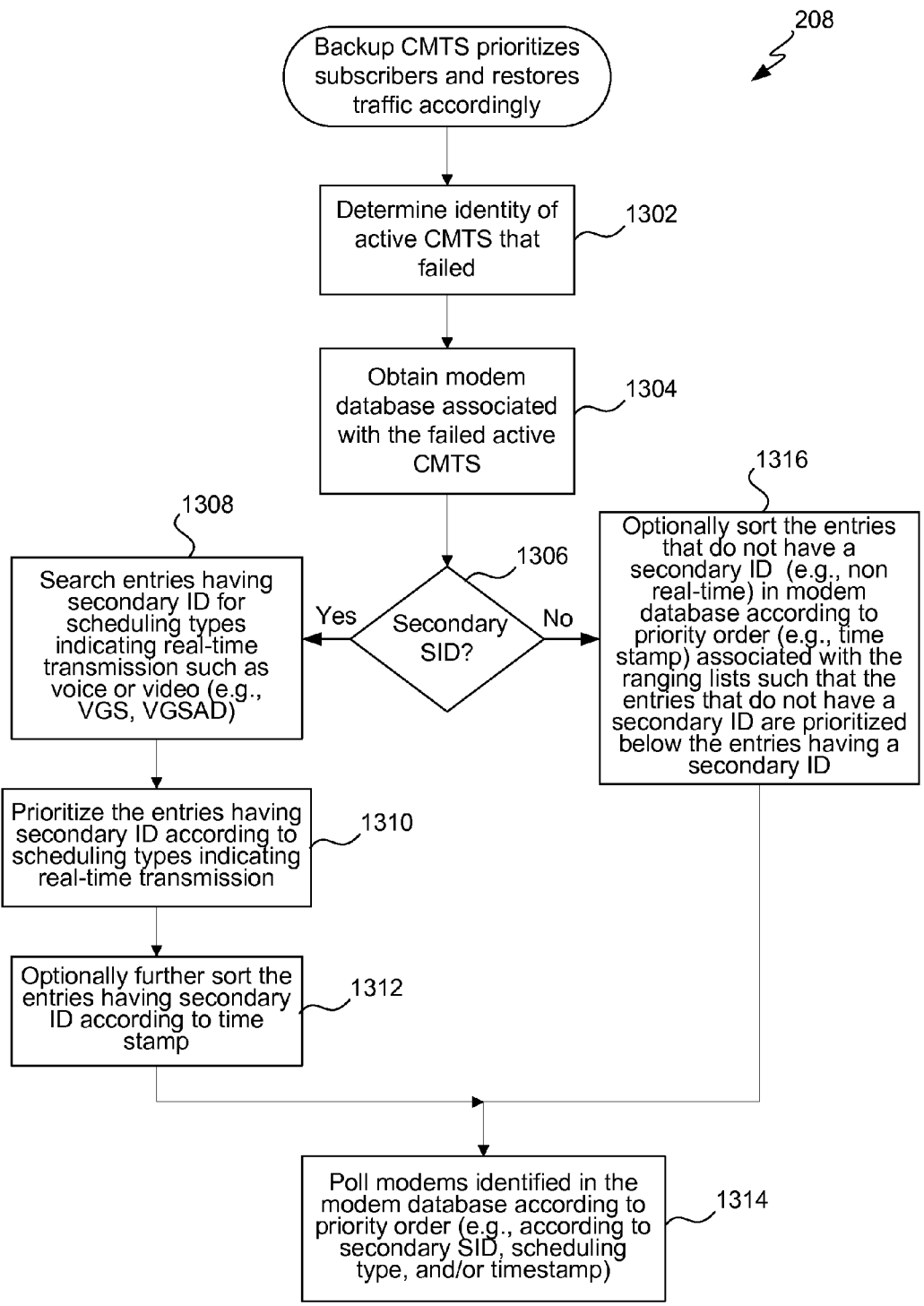
FIG. 13 is a process flow diagram illustrating a method of prioritizing subscribers and restoring traffic accordingly as shown at block 208 of FIG. 2 in accordance with another embodiment of the invention.

As described above, prioritization of subscribers and restoration of traffic may be performed solely based upon priority order as described above with reference to FIG. 6. However, as described above with reference to FIG. 12, subscriber information (e.g., sent in the form of one or more sync messages) may include various information such as a secondary subscriber identifier. FIG. 13 is a process flow diagram illustrating a method of prioritizing subscribers and restoring traffic accordingly as shown at block 208 of FIG. 2 in accordance with another embodiment of the invention. As shown, the backup CMTS determines the identity of the previously active CMTS that has failed at block 1302. Subscriber information associated with the failed active CMTS are then obtained at block 1304. For instance, one or more modem databases storing subscriber information for one or more modems supported by the active CMTS may be obtained from memory by the backup CMTS.

Once the subscriber information for the failed active CMTS is obtained by the backup CMTS, it is then prioritized according to the traffic type (instead of or in addition to time stamp). More specifically, as described above, the secondary subscriber identifier indicates that the messages to be transmitted between the backup CMTS and the associated cable modem are to be transmitted in real-time. For instance, the messages to be transmitted may include voice or video data. Thus, the traffic having an assigned secondary subscriber identifier is prioritized above that having solely a primary subscriber identifier. As shown at block 1306, the subscriber information (e.g., each entry) is searched for a secondary subscriber identifier. The subscriber information (and therefore the associated modems) having a secondary subscriber identifier is then prioritized such that the subscriber information has a higher priority than the subscriber information that does not have a secondary subscriber identifier.

In addition, the scheduling type further indicates the type of traffic to be transmitted for traffic having an associated secondary subscriber identifier. More specifically, the scheduling type may indicate whether the messages to be transmitted between the backup CMTS and the associated cable modem include voice data or video data. Possible scheduling types may include, for example, Unsolicited Grant Service (UGS) and Unsolicited Grant Service with Activity Detection (UGS-AD). Thus, within the entries having a secondary subscriber identifier, the entries may be further searched and prioritized according to scheduling type at blocks 1308 and 1310. It is also possible to further prioritize the subscriber information having a secondary identifier according to time of receipt (e.g., time stamp) of the subscriber information by the backup CMTS from the active CMTS at block 1312. Of course, as described above with reference to FIG. 6, it is possible to prioritize the entries that do not have a secondary identifier (e.g., non real-time traffic) according to time of receipt of the ranging lists as shown at block 1316. These sorted entries that do not have a secondary subscriber identifier associated therewith will therefore be prioritized among themselves, but will be prioritized below those having a secondary subscriber identifier. Alternatively, those entries not having a secondary subscriber identifier may simply be prioritized as a group below those having a secondary subscriber identifier. Once prioritized, the modems identified in the modem database are polled according to priority order at block 1314. As described above, this priority order may be performed according to secondary subscriber identifier, scheduling type, and/or time stamp.

Figure 14:
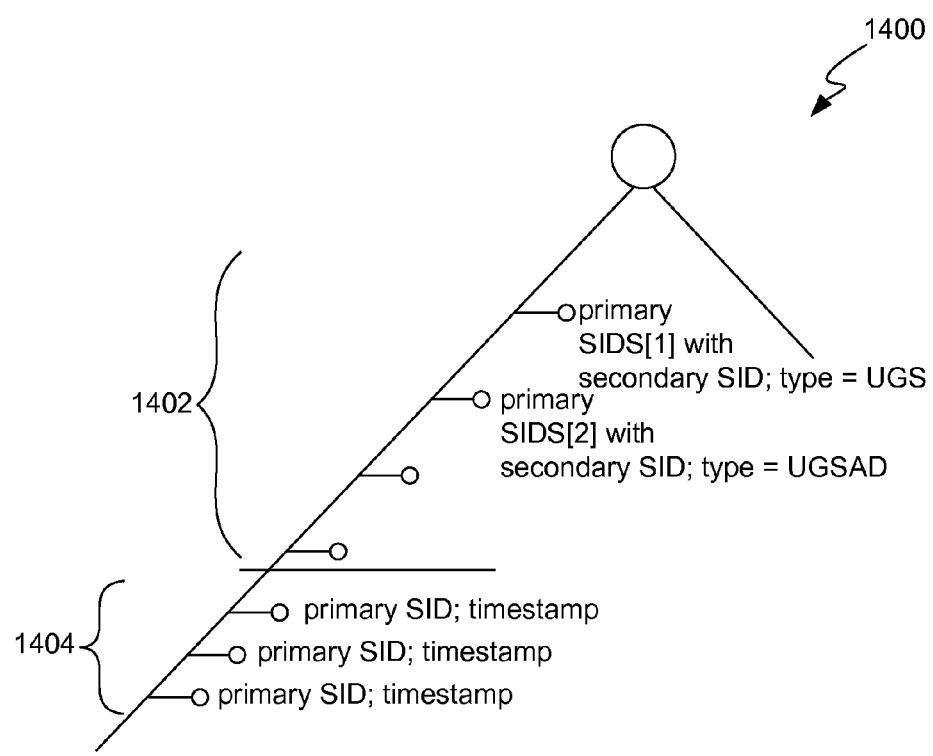
FIG. 14 is a diagram illustrating an exemplary tree data structure that may be used to store prioritized subscriber information for an active CMTS in accordance with various embodiments of the invention.

FIG. 14 is a diagram illustrating an exemplary tree data structure 1400 that may be used to store prioritized subscriber information for an active CMTS in accordance with various embodiments of the invention. As shown, those entries 1402 having both a primary subscriber identifier and a secondary subscriber identifier are prioritized above those entries 1404 having only a primary subscriber identifier. Within the entries 1402 having both a primary subscriber identifier and a secondary subscriber identifier, the entries are prioritized according to scheduling type. Similarly, within the entries 1404 having solely a primary subscriber identifier, the entries are prioritized according to time stamp.

Figure 15:
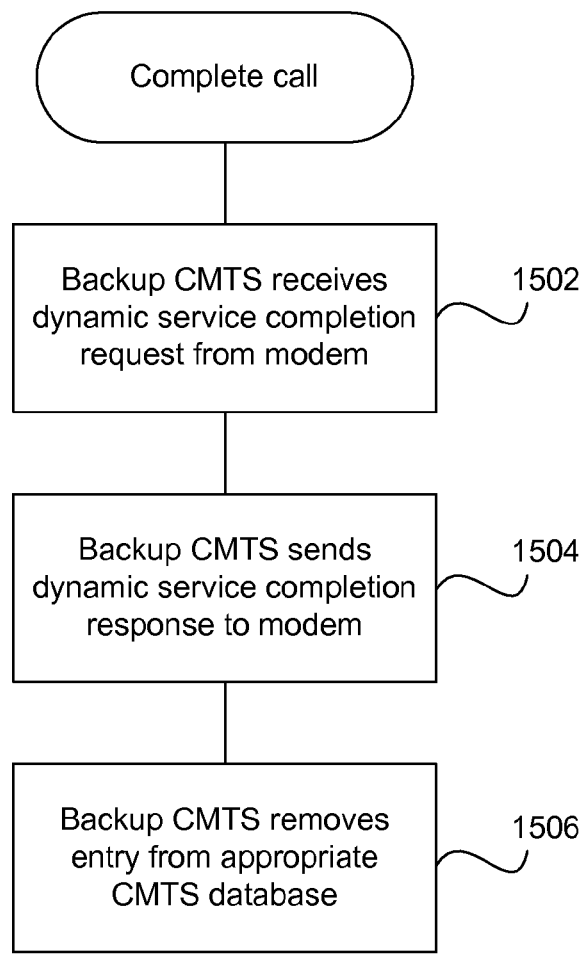
FIG. 15 is a process flow diagram illustrating a method of ending a call initiated by a modem in accordance with various embodiments of the invention.

Once a modem call is completed, it is desirable to modify the stored subscriber information maintained by the backup CMTS. At this time, the active CMTS is non-functional, and therefore the switchover to the backup CMTS has already been performed. Thus, although the telephone call was initiated when the active CMTS was operational, the telephone survived the crash of the active CMTS that subsequently occurred. FIG. 15 is a process flow diagram illustrating a method of ending a call initiated by a modem in accordance with various embodiments of the invention. As shown, the backup CMTS receives a dynamic service completion request from a modem at block 1502 that indicates that the call initiated by the cable modem has been terminated. The backup CMTS sends a dynamic service completion response to the modem at block 1504. The backup CMTS then removes the subscriber information (e.g., entry) associated with the cable modem from memory associated with a previously failed active CMTS at block 1506. For instance, as described above, a separate CMTS database may be maintained by the backup CMTS for each active CMTS it supports.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions.

Figure 16:
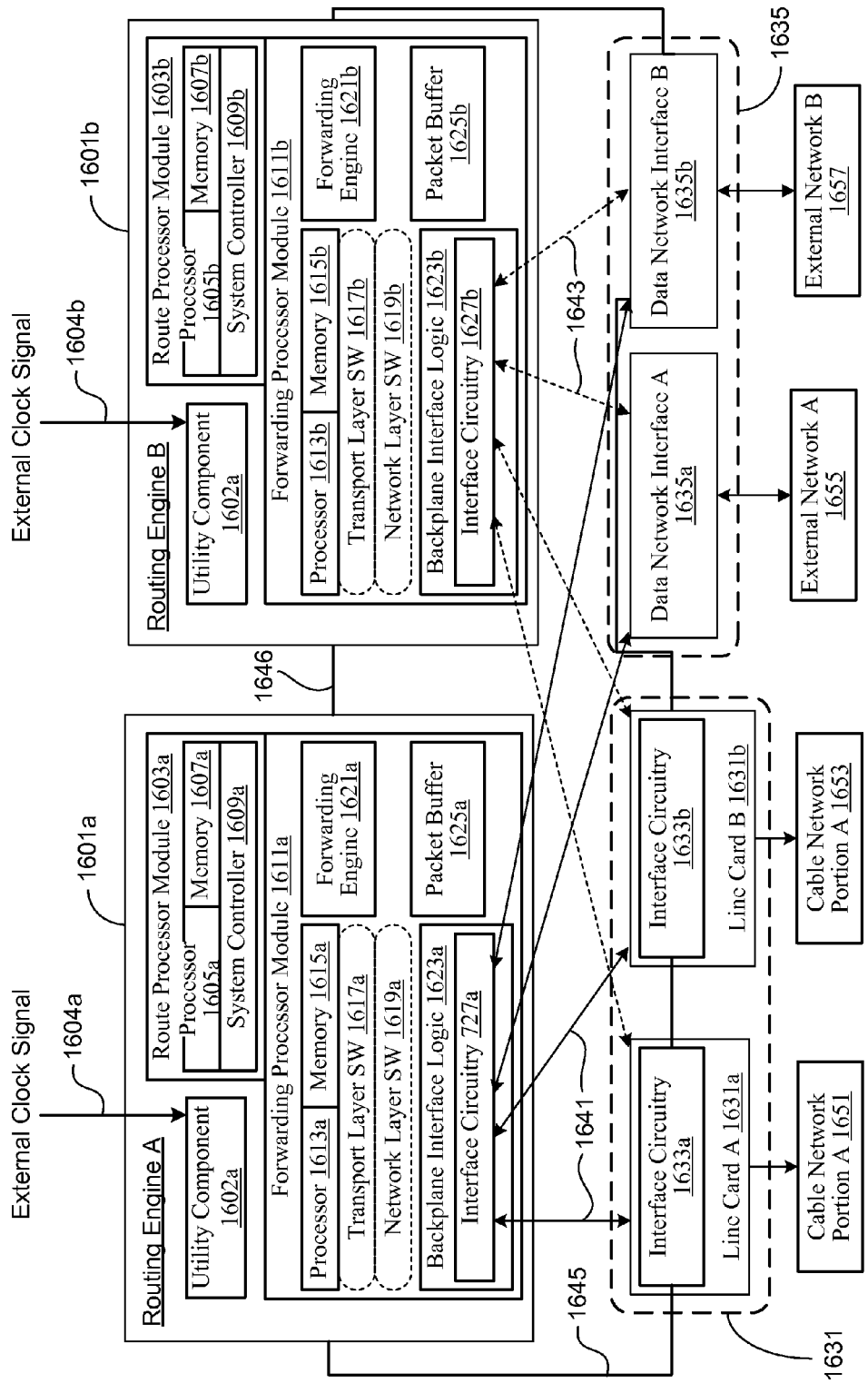
FIG. 16 is a block diagram illustrating a Cable Modem Termination System (CMTS) which may be used for implementing one or more techniques of the present invention.

FIG. 16 shows a block diagram of a specific embodiment of a Cable Modem Termination System (CMTS) 1600 which may be used to implement certain aspects of the present invention. As shown in FIG. 16, the CMTS 1600 may comprise a plurality of routing engines (e.g. 1601a, 1601b). In a specific implementation, Routing Engine A 1601a may be configured as a primary or working routing engine, while Routing Engine B 1601b may be configured as a backup or standby routing engine which provides redundancy functionality.

As shown in the embodiment of FIG. 16, each of the routing engines may include a variety of similar modules and/or components. In order to avoid confusion, the various components and/or modules relating to Routing Engine A 1601a will now be described in greater detail with the understanding that such descriptions may also be applied to the corresponding components and modules of Routing Engine B 1601b.

According to a specific embodiment, Routing Engine A may be configured or designed to include a plurality of functionally different modules or components, including, for example, a Forwarding Processor (FP) Module 1611a adapted to provide packet forwarding functionality; a Route Processor (RP) Module 1603a adapted to implement routing or forwarding operations; a utility component 1602a adapted to provide system clock and timestamp functionality; etc. The routing engine components may be configured to provide layer one, layer two, layer three and layer four functionality as well as quality of service (QoS) functionality.

According to a specific implementation, the RP Module 1603a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 16, the RP Module 1603a comprises a general-purpose processor 1605a (e.g., a MIPS route processor) coupled to a system controller 1609a and memory 1607a. It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 1607a may comprise synchronous dynamic random access memory (SDRAM) storage locations addressable by the processor 1605a for storing software programs and data structures accessed by the components. A network routing operating system, portions of which may reside in memory and executed by the route processor, functionally organizes the router by invoking network operations in support of software processes executing on the router.

The RP processor 1605a may be configured to construct and load routing tables used by the FP Module 1611a. The processor 1605a may also be configured or designed to perform configuration management functions of the routing engine 1601a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 1627a may be coupled to the respective interface circuitry 1633a, 1633b of line cards 1631a, 1631b. According to a specific implementation, interface circuitry 1627a may be configured to reside on a backplane logic circuit 1623a of the routing engine. In one example, the backplane logic circuit 1623a is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 1625a and a forwarding engine 1621a of the FP Module 1611a. The packet buffer 1625a may include memory which is configured to store packets as the forwarding engine 1621*a* performs its packet forwarding functions. For example, the packet buffer may be used to store low priority data packets while high priority, low latency voice packets are forwarded by the forwarding engine to a data network interface 1635*a*. According to various embodiments, the FP Module 1611 may comprise a processor 1613*a* and memory 1615*a* for handling transport layer 1617 and network layer 1619 functionality. In one implementation, the processor 1613*a* may be configured to track accounting, port, and billing information for various users on a cable modem network 1651. The processor 1613*a* may also be configured to maintain desired service flow or session state information in memory 1615*a* such as, for example, for voice calls initiated over the cable modem network. The FP Module 1611*a* may also be configured to provide transaction compacting functionality, data parcel tunneling functionality, switching functionality, filtering option selection and filtering functionality, etc.

According to a specific implementation, Routing Engine A 1601*a* may be connected to Routing Engine B 1601*b* via at least one link 1646, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 1631, 1635) via point-to-point links. For example, as shown in FIG. 16, each of the plurality of line cards 1631 and 1635 are connected to each of the routing engines 1601*a*, 1601*b* via point-to-point links 1641 and 1643. One advantage of the point-to-point link configuration is that it provides additional reliability in that the failure of one or more line cards will not interfere with communications between other line cards and the routing engine(s). For example, if Line Card A 1631*a* suddenly failed, each of the routing engines would still be able to communicate with the other line cards.

According to a specific embodiment, the plurality of line cards may include different types of line cards which have been specifically configured to perform specific functions. For example, line cards 1631 may correspond to radio-frequency (RF) line cards which have been configured or designed for use in a cable network. Additionally, line cards 1635 may correspond to network interface cards which have been configured or designed to interface with different types of external networks (e.g. WANs, LANs,) utilizing different types of communication protocols (e.g. Ethernet, Frame Relay, ATM, TCP/IP, etc). For example, the data network interface 1635*a* functions as an interface component between external data sources and the cable system. The external data sources transmit data to the data network interface 1635*a* via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 1619*a*.

According to a specific implementation, the operations associated with obtaining an IP address for cable modems may be implemented by the network layer software. This may involve the CMTS communicating with a DHCP server (not shown) via a data network interface, for example.

As shown in FIG. 16, at least a portion of the line cards includes interface circuitry for providing an appropriate interface between the host line card, other line cards, and/or the routing engine(s). For example, interface circuitry 1633*a* may include interconnect ports coupled to one or more of the point-to-point links 1641, 1643. According to a specific implementation, the interface circuitry functions as a translator that converts conventional formats of data received at the line cards to a suitable protocol format for transmission from the line card to the appropriate routing engine. In one implementation, the interface circuitry 1633*a* may also include circuitry to perform cyclic redundancy code (CRC) generation and checking on packets, along with interconnect format checking.

According to a specific embodiment, the point-to-point links 1641, 1643 may be configured as clock forwarded links such that each point-to-point link comprises a at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engines (1601*a*, 1601*b*) and a portion of the cable network. The data network interface 1635*a* may couple the routing engine 1601*a* to an external data network 1655 such as, for example, the Internet.

According to one embodiment, all or selected lines cards, routing engines and/or data network interfaces may be configured to use at least one common dedicated line or backplane (e.g. 1645). According to other embodiments, the routing engines 1601*a*, 1601*b* may have an additional dedicated connection(s) for supporting redundancy. In a specific implementation, the backplane may be configured as an Ethernet medium that is shared by the CMTS. When the line cards are inserted into the backplane, they communicate with the routing engines over the lines 1645 in accordance with a "capabilities" exchange that identifies the types of line cards and their various characteristics/parameters.

According to a specific implementation, during initialization of the CMTS, the routing engines 1601*a* and 1601*b* negotiate for working routing engine status over the backplane. Assertion of working status causes the line cards 1631 to configure their respective interface circuitry to communicate with the designated working routing engine (e.g. Routing Engine A 1601*a*). The Routing Engine A 1601*a* then configures the CMTS and line cards, establishes routing relationships, and initiates traffic forwarding operations. The redundant routing engine 1601*b* may complete a self-test and perform initialization of its various functions. The two routing engine assemblies may then exchange conventional negotiation messages (which may include, for example, health and status messages) via the backplane lines 1645. According to a specific implementation, the exchanged messages are defined by an Enhanced High System Availability (EHSA) negotiation algorithm available from Cisco Systems, Inc. of San Jose, Calif. The redundant routing engine may also request transaction information from the working routing engine.

When the redundant routing engine 1601b detects that the primary routing engine has failed, the redundant routing engine may take over as the new working routing engine, and initiate a "cutover" operation to thereby cause the line card interface circuitry (e.g. 1633a, 1633b) to identify and communicate with the new working routing engine 1601b. The new working routing engine 1601b may then access and retrieve state information (such as, for example, telephone call state information, service flow state information, etc.) stored on selected line cards in order to maintain existing service flows.

Prior to a failure situation, the redundant routing engine 1601b may be configured to monitor the status of the working routing engine 1601a, and may further be configured or designed to receive updated configuration, transaction and/or state information, which may then be stored in an appropriate location in the redundant routing engine 1601b.

The line cards may further comprise circuitry for "looping" packets back onto the redundant routing engine 1601b over the point-to-point links. This allows the redundant routing engine 1601b to send and receive test packets to evaluate its own operation in addition to the operation of the dedicated lines prior to the occurrence of a system failure.

The techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 16 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 1607a, 1615a, etc.) configured to store program instructions for the network operations and other functions of the present invention described herein. The program instructions may specify an operating system and one or more applications, for example. Such memory or memories may also be configured to store data structures, selected filtering criteria, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 17:
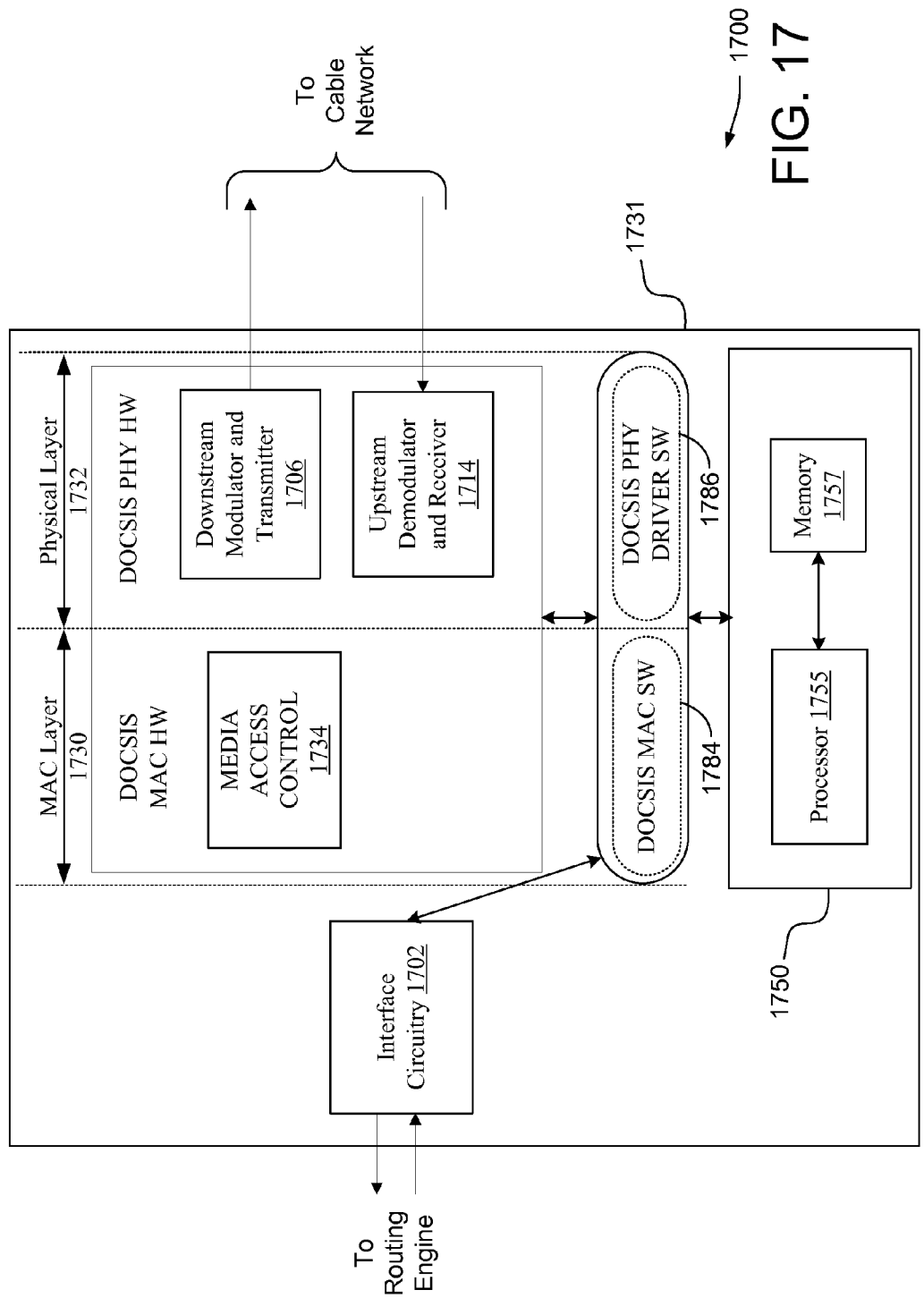
FIG. 17 is a block diagram illustrating a specific embodiment of a line card which may be used for implementing certain aspects of the present invention.

FIG. 17 shows a specific embodiment of a line card 1700 which may be used for implementing certain aspects of the present invention. According to a specific embodiment, the line card 1700 may be configured or designed to implement selected aspects of the DOCSIS functionality which were conventionally implemented by the CMTS, such as, for example, DOCSIS MAC functionality.

In the specific embodiment as shown in FIG. 17, line card 1700 provides functions on several network layers, including a physical layer 1732, and a Media Access Control (MAC) layer 1730. Generally, the physical layer is responsible for receiving and transmitting RF signals on the cable plant. Hardware portions of the physical layer include at least one downstream modulator and transmitter 1706 and/or at least one upstream demodulator and receiver 1714. The physical layer also includes software 1786 for driving the hardware components of the physical layer.

Upstream optical data signals (packets) arriving via an optical fiber node are converted to electrical signals, and then demodulated by the demodulator/receiver 1714. The demodulated information is then passed to MAC layer block 1730.

A primary purpose of MAC layer 1730 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream), or to the CMTS (if sent upstream). Note that the cable modems also include MAC addressing components. In the cable modems, these components encapsulate upstream data with a header containing the MAC address of the CMTS.

MAC layer 1730 includes a MAC hardware portion 1734 and a MAC software portion 1784. The MAC layer software portion may include software relating to DOCSIS MAC functionality, filtering option selection and filtering functionality, etc. The MAC layer hardware and software portions operate together to provide the above-described DOCSIS MAC functionality. In a preferred embodiment, MAC controller 1734 is dedicated to performing some MAC layer functions, and is distinct from processor 1755.

After MAC layer block 1730 has processed the upstream information, it is then passed to interface circuitry 1702. As described previously, interface circuitry 1702 includes the appropriate hardware and/or software for converting data formats received at the line cards to a suitable protocol format for transmission from the line card to an appropriate routing engine.

When a packet is received from the routing engine at the interface circuitry 1702, the packet is then passed to MAC layer 1730. The MAC layer 1730 also transmits information via a one-way communication medium to downstream modulator and transmitter 1706. Downstream modulator and transmitter 1706 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

As shown in FIG. 17, line card 1700 includes a central hardware block 1750 including one or more processors 1755 and memory 1757. These hardware components interact with software and other hardware portions of the various layers within the line card. They provide general purpose computing power for much of the software. Memory 1757 may include, for example, I/O memory (e.g. buffers), program memory, shared memory, etc. One or more data structures used for implementing the technique of the present invention may reside in such memory. In one embodiment, the software entities 1782, 1784, and 1786 are implemented as part of a network operating system running on hardware 1750. Preferably, at least a part of the filtering functionality of this invention is implemented in software as part of the operating system. In FIG. 17, such software may be part of MAC layer software 1784, or may be closely associated therewith. Of course, the filtering logic of the present invention could reside in hardware, software, or some combination of the two.

According to a specific implementation, the procedures typically employed by the CMTS during registration and pre-registration may be performed at the MAC layer of the line card 1700. In such an embodiment, most of the registration operations may be performed by the hardware and software provided for MAC layer logic 1730.

It will be appreciated that, according to a specific embodiments, at least a portion of functions described herein which are performed by the CMTS (e.g. FIG. 7), line cards (e.g. FIG. 17), or selected components thereof, may be implemented in a centralized CMTS system (e.g. residing at the Head End Complex of the cable network and/or may be implemented at one or more distributed CMTS (DCMTS) systems (e.g. residing at one or more fiber nodes.

Further, it will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

Generally, the techniques (e.g., performed by the backup CMTS) of the present invention may be implemented on software and/or hardware. That is, the may be subscriber information may be obtained and prioritized by any suitable device. The prioritizing techniques may also be implemented within the same device on which the prioritized data is stored. By way of other examples, the prioritizing techniques can be implemented in an operating system kernel, in a separate user process, in a library package bound into network applications, on a specially constructed machine, or on a network interface card. In a specific embodiment of this invention, the prioritizing techniques of the present invention is implemented in software such as an operating system or in an application running on an operating system.

A software or software/hardware hybrid implementation of the monitoring technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the monitoring devices of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the monitoring techniques of this invention may be implemented on a general-purpose network host machine such as a personal computer or workstation. Further, the invention may be at least partially implemented on a card (e.g., an interface card) for a network device or a general-purpose computing device.

Figure 18:
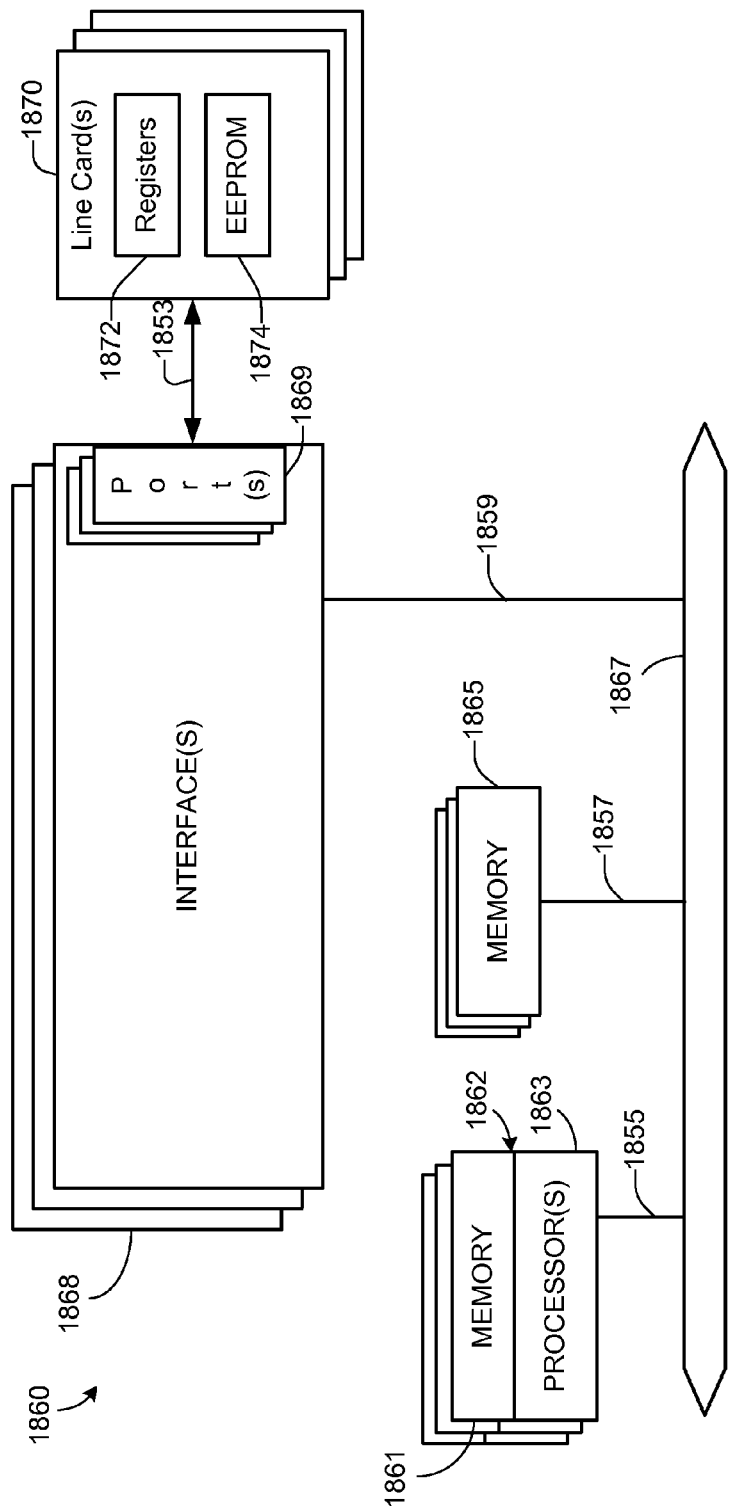
FIG. 18 is a block diagram illustrating a network device suitable for implementing one or more techniques of the present invention.

Referring now to FIG. 18, a network device 1860 suitable for implementing various techniques of the present invention includes a master central processing unit (CPU) 1862, interfaces 1868, and a bus 1867 (e.g., a PCI bus). When acting under the control of appropriate software or firmware, the CPU 1862 may be responsible for implementing specific functions associated with the functions of a desired network device. For example, when configured as a prioritizing device, the CPU 1862 may be responsible for analyzing packets, encapsulating packets, forwarding packets to appropriate network devices, etc. The CPU 1862 preferably accomplishes all these functions under the control of software including an operating system (e.g. Windows NT), and any appropriate applications software.

CPU 1862 may include one or more processors 1863 such as a processor from the Motorola family of microprocessors or the MIPS family of microprocessors. In an alternative embodiment, processor 1863 is specially designed hardware for controlling the operations of network device 1860. In a specific embodiment, a memory 1861 (such as non-volatile RAM and/or ROM) also forms part of CPU 1862. However, there are many different ways in which memory could be coupled to the system. Memory block 1861 may be used for a variety of purposes such as, for example, caching and/or storing data, programming instructions, etc.

The interfaces 1868 are typically provided as interface cards (sometimes referred to as "line cards"). Generally, they control the sending and receiving of data packets over the network and sometimes support other peripherals used with the network device 1860. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1862 to efficiently perform routing computations, network diagnostics, security functions, etc.

Although the system shown in FIG. 18 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1865) configured to store data, program instructions for the general-purpose network operations and/or other information relating to the functionality of the monitoring techniques described herein. The program instructions may control the operation of an operating system and/or one or more applications, for example. The memory or memories may also be configured to include the subscriber information, etc.

Because such information and program instructions may be employed to implement the systems/methods described herein, the present invention relates to machine readable media that include program instructions, state information, etc. for performing various operations described herein. Examples of machine-readable media are listed above.

It will be appreciated that the techniques of the present invention are not limited to cable networks, and may be applied to any access data network which uses at least one shared access communication channel to communicate between a plurality of nodes in the network and a Head End of the network.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. In a backup cable modem termination system, a method of restoring transmission of messages between one or more cable modems and the backup cable modem termination system upon failure of an active cable modem termination system, the method comprising:
   receiving by the backup cable modem termination system subscriber information associated with the one or more cable modems from the active cable modem termination system, the subscriber information including one or more subscriber identifiers;
   prioritizing the one or more cable modems by the backup cable modem termination system using at least one of the subscriber information or a time of receipt of the subscriber information, the prioritized cable modems indicating an order in which the transmission of messages between the one or more cable modems and the backup cable modem termination system is to be restored; and
   polling the one or more cable modems by the backup cable modem termination system in the order indicated by the prioritized cable modems such that communication between the one or more cable modems and the backup cable modem termination system is established in the order indicated by the prioritized cable modems, thereby enabling the transmission of messages between the one or more cable modems and the backup cable modem termination system to be restored.

2. The method as recited in claim 1, wherein the subscriber information identifies those modems that have ranged successfully.

3. The method as recited in claim 1, wherein receiving the subscriber information occurs after a specified period of time or after a call is received by the active cable modem termination system from one or more of the cable modems.

4. The method as recited in claim 1, wherein the subscriber information associated with each of the cable modems comprises a primary subscriber identifier that identifies the associated cable modem.

5. The method as recited in claim 4, wherein the subscriber information further comprises a MAC address associated with the cable modem.

6. The method as recited in claim 4, wherein at least a portion of the subscriber information further comprises a secondary subscriber identifier.

7. The method as recited in claim 6, wherein the secondary subscriber identifier indicates that the messages to be transmitted between the backup cable modem termination system and the associated cable modem are to be transmitted in real-time.

8. The method as recited in claim 6, wherein the secondary subscriber identifier indicates whether the messages to be transmitted between the backup cable modem termination system and the associated cable modem include voice data or video data.

9. The method as recited in claim 6, wherein the subscriber information further comprises quality of service requirements.

10. The method as recited in claim 6, wherein at least a portion of the subscriber information further comprises a scheduling type.

11. The method as recited in claim 10, wherein the scheduling type indicates a type of real-time traffic to be transmitted.

12. The method as recited in claim 10, wherein the secondary subscriber identifier indicates that the messages to be transmitted between the backup cable modem termination system and the associated cable modem are to be transmitted in real-time.

13. The method as recited in claim 10, wherein the scheduling type indicates whether the messages to be transmitted between the backup cable modem termination system and the associated cable modem include voice data or video data.

14. The method as recited in claim 10, wherein the scheduling type is Unsolicited Grant Service or Unsolicited Grant with Activity Detection.

15. The method as recited in claim 10, wherein prioritizing the cable modems comprises:
   searching the subscriber information associated with the cable modems for a secondary subscriber identifier; and
   prioritizing each of the cable modems with subscriber information having a secondary subscriber identifier such that the cable modems with subscriber information having a secondary subscriber identifier have a higher priority than each of the cable modems with subscriber information not having a secondary subscriber identifier.

16. The method as recited in claim 15, wherein prioritizing each of the cable modems with subscriber information having a secondary subscriber identifier further comprises:
   prioritizing each of the cable modems with subscriber information having a secondary subscriber identifier according to the scheduling type.

17. The method as recited in claim 16, wherein prioritizing each of the cable modems with subscriber information having a secondary identifier further comprises:
   prioritizing each of the cable modems with subscriber information having a secondary identifier according to time of receipt of the subscriber information from the active cable modem termination system.

18. The method as recited in claim 15, wherein prioritizing each of the cable modems with subscriber information having a secondary identifier further comprises:
   prioritizing each of the cable modems with subscriber information not having a secondary identifier according to time of receipt of the subscriber information from the active cable modem termination system.

19. The method as recited in claim 6, wherein the secondary subscriber identifier indicates whether the messages to be transmitted between the backup cable modem termination system and the associated cable modem includes high priority traffic.

20. The method as recited in claim 1, wherein prioritizing the cable modems comprises:
   storing the subscriber information and a time of receipt of the subscriber information by the backup cable modem termination system such that the subscriber information is associated with the time of receipt.

21. The method as recited in claim 20, wherein the subscriber information is stored in order of the time of receipt.

22. The method as recited in claim 1, further comprising:
   receiving an indication that a call initiated by one of the cable modems has been terminated; and
   removing subscriber information associated with the one of the cable modems from memory associated with a previously failed active cable modem termination system.

23. A computer-readable medium storing thereon computer-readable instructions for performing a method in a backup cable modem termination system of restoring transmission of messages between one or more cable modems and the backup cable modem termination system upon failure of an active cable modem termination system, comprising:
   instructions for receiving by the backup cable modem termination system subscriber information associated with the one or more cable modems from the active cable modem termination system, the subscriber information including one or more subscriber identifiers;
   instructions for prioritizing the one or more cable modems by the backup cable modem termination system using at least one of the subscriber information or a time of receipt of the subscriber information, the prioritized cable modems indicating an order in which the transmission of messages between the one or more cable modems and the backup cable modem termination system is to be restored; and
   instructions for polling the one or more cable modems by the backup cable modem termination system in the order indicated by the prioritized cable modems such that communication between the one or more cable modems and the backup cable modem termination system is established in the order indicated by the prioritized cable modems, thereby enabling the transmission of messages between the one or more cable modems and the backup cable modem termination system to be restored.

24. A backup cable modem termination system adapted for restoring transmission of messages between one or more cable modems and the backup cable modem termination system upon failure of an active cable modem termination system, comprising:
   means for receiving by the backup cable modem termination system subscriber information associated with the one or more cable modems from the active cable modem termination system, the subscriber information including one or more subscriber identifiers;
   means for prioritizing the one or more cable modems by the backup cable modem termination system using at least one of the subscriber information or a time of receipt of the subscriber information, the prioritized cable modems indicating an order in which the transmission of messages between the one or more cable modems and the backup cable modem termination system is to be restored; and
   means for polling the one or more cable modems by the backup cable modem termination system in the order indicated by the prioritized cable modems such that communication between the one or more cable modems and the backup cable modem termination system is established in the order indicated by the prioritized cable modems, thereby enabling the transmission of messages between the one or more cable modems and the backup cable modem termination system to be restored.

25. A backup cable modem termination system adapted for restoring transmission of messages between one or more cable modems and the backup cable modem termination system upon failure of an active cable modem termination system, comprising:
   a processor; and
   a memory, at least one of the processor or the memory being adapted for:
   receiving by the backup cable modem termination system subscriber information associated with the one or more cable modems from the active cable modem termination system, the subscriber information including one or more subscriber identifiers;
   prioritizing the one or more cable modems by the backup cable modem termination system using at least one of the subscriber information or a time of receipt of the subscriber information, the prioritized cable modems indicating an order in which the transmission of messages between the one or more cable modems and the backup cable modem termination system is to be restored; and
   polling the one or more cable modems by the backup cable modem termination system in the order indicated by the prioritized cable modems such that communication between the one or more cable modems and the backup cable modem termination system is established in the order indicated by the prioritized cable modems, thereby enabling the transmission of messages between the one or more cable modems and the backup cable modem termination system to be restored.

26. The backup cable modem termination system as recited in claim 25, wherein at least one of the processor or the memory being further adapted for performing prioritizing and polling in response to a failover trigger from the active cable modem termination system.

27. The backup cable modem termination system as recited in claim 25, at least one of the processor or the memory being further adapted for:
   determining that the active cable modem termination system has failed;
   wherein prioritizing and polling are performed after determining that the active cable modem termination system has failed.

28. The backup cable modem termination system as recited in claim 25, at least one of the processor or the memory being further adapted for:
   storing the subscriber information after receiving the subscriber information;
   wherein prioritizing the cable modems comprises prioritizing subscribers associated with the cable modems using the stored subscriber information.

29. The backup cable modem termination system as recited in claim 25, at least one of the processor or the memory being further adapted for:

storing the subscriber information and a time of receipt of the subscriber information by the backup cable modem termination system such that the subscriber information is associated with the time of receipt.

30. The backup cable modem termination system as recited in claim 29, at least one of the processor or the memory being further adapted for:

prioritizing the cable modems according to the time of receipt of the corresponding subscriber information.

31. The backup cable modem termination system as recited in claim 25, further comprising:

after receiving the subscriber information, sending an acknowledgement of the subscriber information to the active cable modem termination system.

32. The backup cable modem termination system as recited in claim 25, at least one of the processor or the memory being further adapted for:

repeatedly receiving subscriber information associated with one or more cable modems from an active cable modem termination system prior to prioritizing the cable modems.

33. The backup cable modem termination system as recited in claim 32, at least one of the processor or the memory being further adapted for:

receiving subscriber information associated with one or more cable modems from a first active cable modem termination system and receiving subscriber information associated with one or more cable modems from a second active cable modem termination system; and wherein prioritizing the cable modems comprises prioritizing the cable modems associated with the first active cable modem termination system is performed separately from prioritizing the cable modems associated with the second active cable modem termination system.

34. The backup cable modem termination system as recited in claim 33, at least one of the processor or the memory being further adapted for:

storing information corresponding to the prioritized cable modems associated with the first active cable modem termination system separately from information corresponding to the prioritized cable modems associated with the second active cable modem termination system.

35. The backup cable modem termination system as recited in claim 25, at least one of the processor or the memory being further adapted for:

receiving an indication that an active cable modem termination system has failed;

determining an identity of the failed active cable modem termination system; and wherein receiving subscriber information associated with one or more cable modems from the active cable modem termination system comprises obtaining the subscriber information associated with the failed active cable modem termination system.

36. The backup cable modem termination system as recited in claim 25, wherein prioritizing the cable modems comprises:

prioritizing the cable modems according to at least one of scheduling type identified in the subscriber information, presence of secondary subscriber identifier in the subscriber information, or time of receipt of the subscriber information by the backup cable modem termination system from the active cable modem termination system.

37. The backup cable modem termination system as recited in claim 25, wherein the subscriber information indicates a priority assigned to each of the cable modems.

38. The backup cable modem termination system as recited in claim 25, wherein the subscriber information indicates whether real-time data traffic is to be transmitted in association with each of the cable modems, wherein prioritizing the cable modems includes prioritizing the cable modems according to whether real-time data traffic is to be transmitted in association with each of the cable modems.

39. The backup cable modem termination system as recited in claim 25, wherein the subscriber information is separate from messages transmitted between the cable modems and the active cable modem termination system.

40. The backup cable modem termination system as recited in claim 25, wherein the subscriber information indicates a type of the real-time data traffic to be transmitted.

41. The backup cable modem termination system as recited in claim 25, wherein the subscriber information indicates a type of data traffic to be transmitted in association with each of the cable modems, wherein prioritizing the cable modems includes prioritizing the cable modems according to the type of data traffic to be transmitted in association with each of the cable modems.

* * * * *